(12) United States Patent
Takahashi et al.

(10) Patent No.: US 9,557,405 B2
(45) Date of Patent: Jan. 31, 2017

(54) TRACKING PROJECTILE TRAJECTORY WITH MULTIPLE SENSORS

(71) Applicant: BAE SYSTEMS INFORMATION AND ELECTRONIC SYSTEMS INTEGRATION INC., Nashua, NH (US)

(72) Inventors: Jonathan R. Takahashi, Pelham, NH (US); Brian A. Harris, Bedford, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 56 days.

(21) Appl. No.: 14/821,826

(22) Filed: Aug. 10, 2015

(65) Prior Publication Data

US 2016/0047889 A1     Feb. 18, 2016

Related U.S. Application Data

(60) Provisional application No. 62/036,376, filed on Aug. 12, 2014.

(51) Int. Cl.
*G01S 5/16*     (2006.01)
*G01S 5/02*     (2010.01)

(52) U.S. Cl.
CPC . *G01S 5/16* (2013.01); *G01S 5/021* (2013.01)

(58) Field of Classification Search
CPC .................................. G01S 5/16; G01S 5/021
USPC ...................................................... 250/203.6
See application file for complete search history.

(56) References Cited

U.S. PATENT DOCUMENTS

| 4,804,325 A | * | 2/1989 | Willits | ............... F41G 3/2661 |
| | | | | 434/19 |
| 2012/0145785 A1 | * | 6/2012 | Scrogin | .................. F41G 1/38 |
| | | | | 235/404 |

* cited by examiner

*Primary Examiner* — Seung C Sohn
(74) *Attorney, Agent, or Firm* — Global IP Services; Daniel J. Long

(57) ABSTRACT

Disclosed is an example for determining a projectile trajectory with at least two sensors. In one example, the projectile trajectory is estimated using a first sensor having a first angular range. Further, the projectile trajector is estimated using a second sensor having a second angular range. The first sensor and the second sensor are disposed on a platform at different spatial locations. Furthermore, a discrepancy in the projectile trajectory is determined when the projectile moves from the first angular range to the second angular range. The discrepancy is created due to the different spatial locations of the first sensor and the second sensor. An actual projectile trajectory is determined by compensating for the discrepancy in the projectile trajectory using the estimated discrepancy.

20 Claims, 5 Drawing Sheets

TRACKING PROJECTILE TRAJECTORY WITH MULTIPLE SENSORS

CROSS-REFERENCE TO RELATED APPLICATIONS

This application is related to provisional application U.S. Ser. No. 62/033,906, titled METHOD AND SYSTEM FOR GUNFIRE DETECTION filed on Aug. 6, 2014.

This Application claims rights under 35 USC §119(e) from U.S. Application 62/036,376 filed on Aug. 12, 2014, the contents of which are incorporated herein by reference.

STATEMENT OF GOVERNMENT INTEREST

This invention was made with United States Government support under Contract No. W15P7T-060D-T206 awarded by the UNITED STATES ARMY. The United States Government has certain rights in this invention.

BACKGROUND OF THE INVENTION

Field of the Invention

The present invention relates to projectile tracking, and more specifically,.

tracking projectile trajectory with multiple sensors by compensating for discrepancy (e.g., parallax) created due to different spatial locations of the sensors.

Brief Description of Related Art

A projectile may be tracked with a number of sensors installed on a platform, such as a stationary structure or a vehicle. Example projectile may be a bullet, artillery shell, missile, bombs, or other object that exhibit the characteristics consistent with a bullet in flight. The projectile may be propelled from any firearm, such as rifle, pistol, handgun, shotgun, muzzle loader, air gun, and the like. The sensors for tracking the projectile trajector may be spaced apart from each other. The displacement of the sensors may create a parallax, which can be discrepancies of observations/difference in the apparent position of the projectile measured by the sensors in different spatial locations (i.e. viewed along different lines of sight). The parallax may be magnified with the increase in distance between the sensors. Nearby projectiles may have a larger parallax than more distant projectiles when observed from different positions. Tracked projectiles that are close, or near-miss projectiles, may create discontinuous plotted paths based on the parallax.

SUMMARY OF THE INVENTION

Systems and methods for determining a projectile trajectory with at least two sensors are disclosed. In one aspect, the projectile trajectory is estimated using a first sensor having a first angular range. Further, the projectile trajectory is estimated using a second sensor having a second angular range. The first sensor and the second sensor are disposed on a platform at different spatial locations. Furthermore, a discrepancy in the projectile trajectory is determined when the projectile moves from the first angular range to the second angular range. The discrepancy is created due to the different spatial locations of the first sensor and the second sensor. An actual projectile trajectory is determined by compensating for the discrepancy in the projectile trajectory using the determined discrepancy. In addition, a miss distance of the projectile from the platform and the projectile speed are determined using the determined actual projectile trajectory upon compensating for the discrepancy.

According to another aspect of the present subject matter, a system includes a first sensor and a second sensor, the first sensor and the second sensor are disposed on a platform at different spatial locations. The system further includes an error detection and correction unit communicatively connected to the first sensor and the second sensor, the error detection and correction unit is configured to perform the method described above.

According to another aspect of the present subject matter, a non-transitory computer-readable storage medium including instructions that are executed by a computational unit to perform the method described above.

The system and method disclosed herein may be implemented in any means for achieving various aspects. Other features will be apparent from the accompanying drawings and from the detailed description that follow.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

DETAILED DESCRIPTION OF THE INVENTION

The examples described herein in detail for illustrative purposes are subject to many variations in structure and design. Projectile may be tracked with a multiple number of sensors disposed on a platform. The platform may be a stationary structure or a vehicle. Example projectile may be a bullet, an artillery shell, a missile, and other object that exhibit the characteristics consistent with the bullet in flight. The projectile may be propelled from any firearm, such as a rifle, a pistol, a handgun, a shotgun, a muzzle loader, an air gun, and the like.

The sensors for tracking the projectile trajectory may be spaced apart from each other. The sensors at different spatial locations may have a limited angular range in a predetermined direction, known as the sensor's boresight. For any pair of sensors, there may exist a region that falls outside of both sensor's angular range. This region is referred to as a blind-spot/lost region. Further, there may exist a region at which the both sensors simultaneously detect the projectile trajectory. This region is referred to as an overlapping region.

When the projectile is in the overlapping region or m the blind-spot region, there may be a discrepancy that manifests as discontinuity in a determined path of the projectile. For example, in the overlapping region, a parallax may be created, which can be discrepancies of observations/difference in the apparent position of the projectile measured by the sensors. Further, tracked projectiles that are close, or near-miss projectiles, may create discontinuity in determined projectile trajectory based on the parallax.

Examples described herein provide an enhanced system, technique and as method for determining projectile trajectory with multiple sensors. In one example, the projectile trajectory may be obtained from the multiple sensors having different angular ranges. When the projectile moves from one angular range to other angular range of the sensors, a discrepancy in the projectile trajectory may be determined. For example, the discrepancy includes a parallax created due to the different spatial locations of the sensors. An actual projectile trajectory may be determined by compensating for the discrepancy in the projectile trajectory. In case of parallax, the actual projectile trajectory may be determined, by compensating for the parallax using a parallax correction.

Furthermore, a miss distance of the projectile from the platform and the projectile speed may be determined using the determined actual projectile trajectory upon compensating for the discrepancy.

Figure 1:
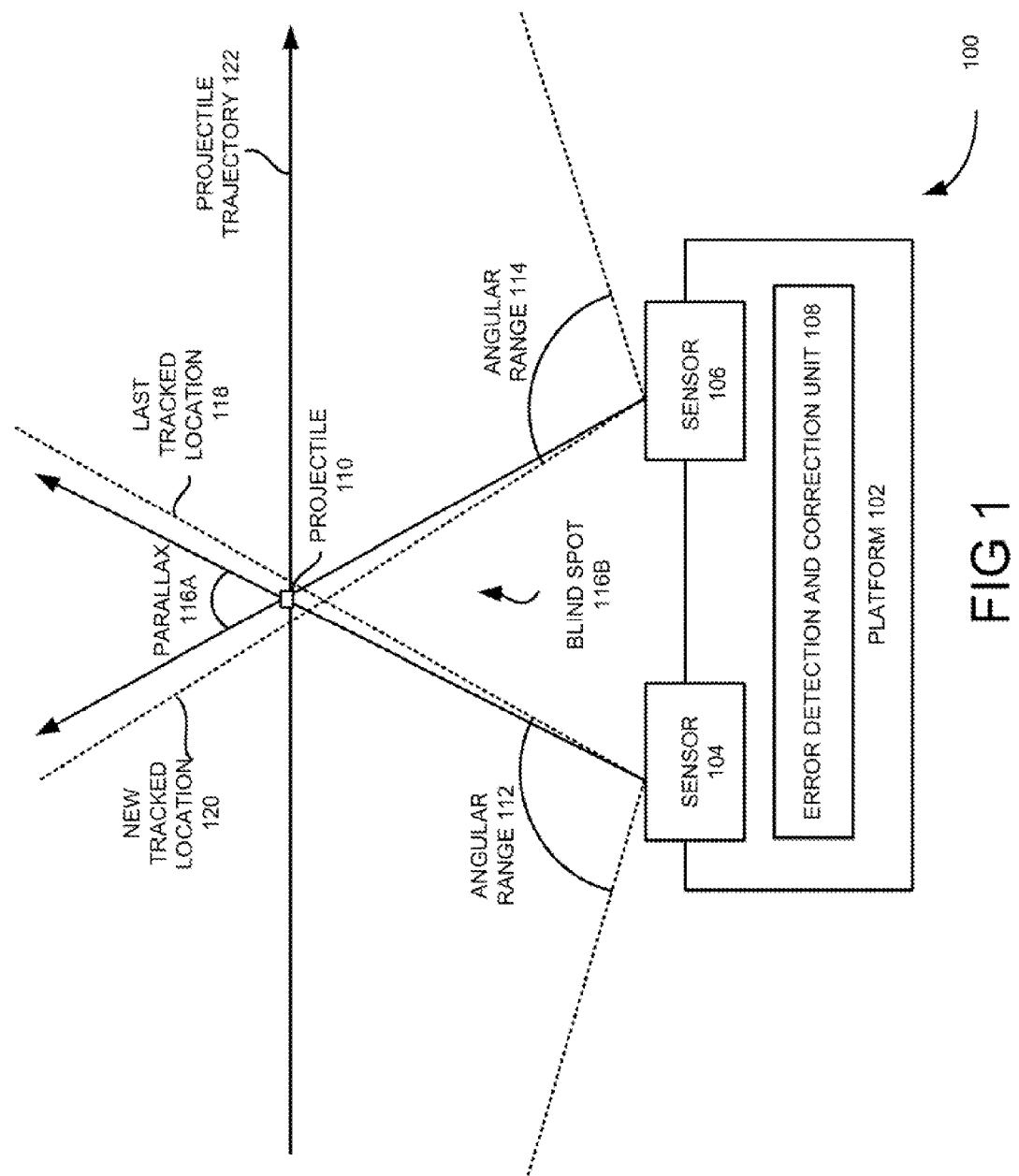
FIG. 1 illustrates an example system for determining projectile trajectory with at least two sensors.

FIG. 1 illustrates an example system 100 for determining projectile trajectory with at least two sensors. The system 100 includes a platform 102 such as a stationary structure or a vehicle (e.g., Aircraft). As shown in FIG. 1, the platform 102 includes a first sensor 104, a second. sensor 106, and an error detection and correction unit 108. Example first sensor 104 and second sensor 106 may include electro-optic (EO) sensors. The first sensor 104 and second sensor 106 are installed at different spatial locations on the platform 102. In operation, the first sensor 104 detects a projectile 110 within a first angular range 112, and the second sensor 106 detects the projectile 110 within a second angular range 114. For example, the first sensor 104 and second sensor 106 may include cameras with different fields of view for tracking the projectile 110, The error detection and correction unit 108 can be any combination of hardware and programming to implement the functionalities described herein. Example error detection and correction unit 108 can include a processor.

Further, the error detection and correction unit 108 may be communicatively connected to the first sensor 104 and the second sensor 106, In operation, the error detection and correction unit 108 estimates/determines the projectile trajectory 122 using the first sensor 104 and the second sensor 106. In the example shown in FIG. 1, the error detection and correction unit 108 may determine angular positions of the projectile 110 with respect to the platform 102 by tracking the projectile 110 using the first sensor 104 and the second sensor 106. Further, the error detection and correction unit 108 may determine/estimate the projectile trajectory 122 by computing a range estimate of the projectile 110 using the determined angular position. The term "angular position" may refer to a measurement of projectile position with respect to a. specified reference position (e.g., vehicle position). For example, the angular position indicates the orientation of the projectile 110 with respect to the vehicle position as expressed by the amount of angular rotation of the projectile 110 necessary to change from one orientation to the other in 3 dimensional (3D) space.

Further in operation, the error detection and correction unit 108 determines a discrepancy in the projectile trajectory 122 when the projectile 110 moves from the first angular range 112 to the second angular range 114. Furthermore, the error detection and correction unit 108 determines an actual projectile trajectory by compensating for the discrepancy in the projectile trajectory 122. For example, the discrepancy includes a parallax created due to the different spatial locations of the first sensor 104 and the second sensor 106 and the actual projectile trajectory may be determined by compensating for the parallax using a parallax correction.

In one example, the error detection and correction unit 108 determines an overlapping region of the projectile trajectory when the projectile is simultaneously tracked by the first and second sensors 104 and 106, resulting in a parallax error 116A. in this case, the error detection and correction unit 108 determines the actual projectile trajectory by normalizing the projectile trajectories determined using the first sensor 104 and second sensor 106 in the overlapping region.

Figure 2A:
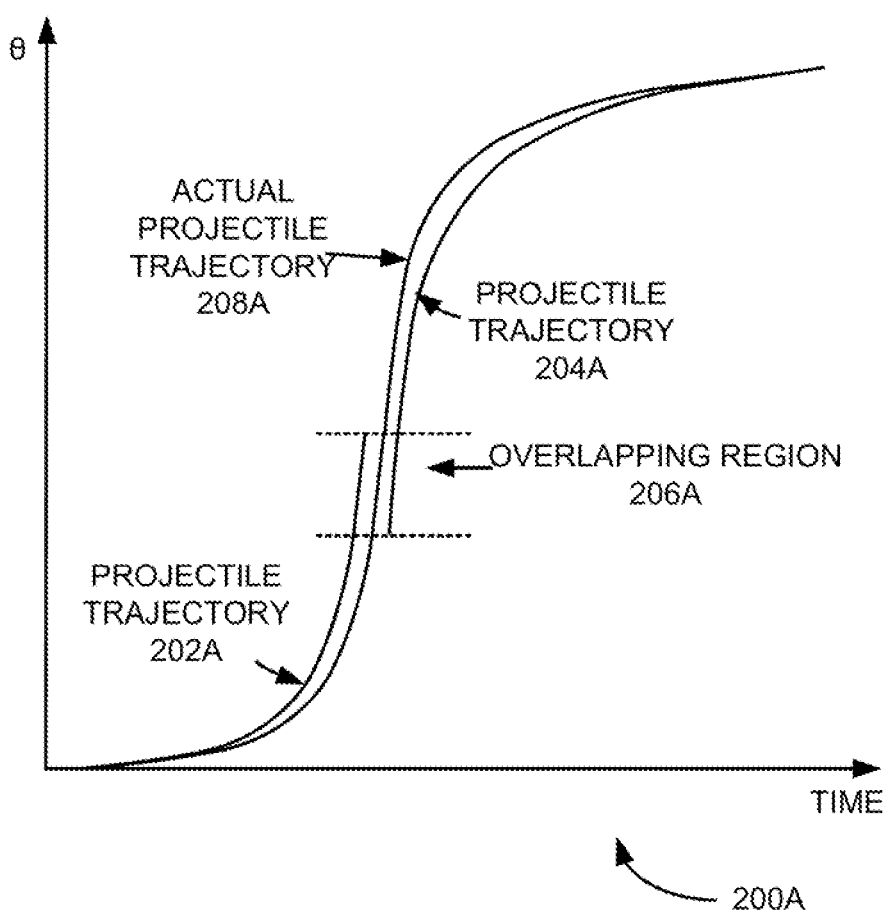
FIG. 2A illustrates an example graphical representation of actual projectile trajectory determined in case of parallax discrepancy.

In the example graph 200A as shown in FIG. 2A, an overlapping region 206A indicates projectile trajectories 202A and 204A that are detected simultaneously (e.g., at the time t1) tier the apparent position (i.e., true bullet location) of the projectile. The projectile trajectory 202A may include a last tracked location 118 (as shown in FIG. 1) associated with angular position of the projectile which is detected for the last time by the first sensor. The projectile trajectory 202A may include a new tracked location 120 (as shown in FIG. 1) associated with angular position of the projectile which is detected for the first time by the second sensor. In this case, the projectile trajectories 202A and 204A may be normalized based on the last tracked location and the new tracked location of the projectile. Further, an actual projectile trajectory 208A may be determined by normalizing the projectile trajectories 202A and 204A in the overlapping region.

Figure 2B:
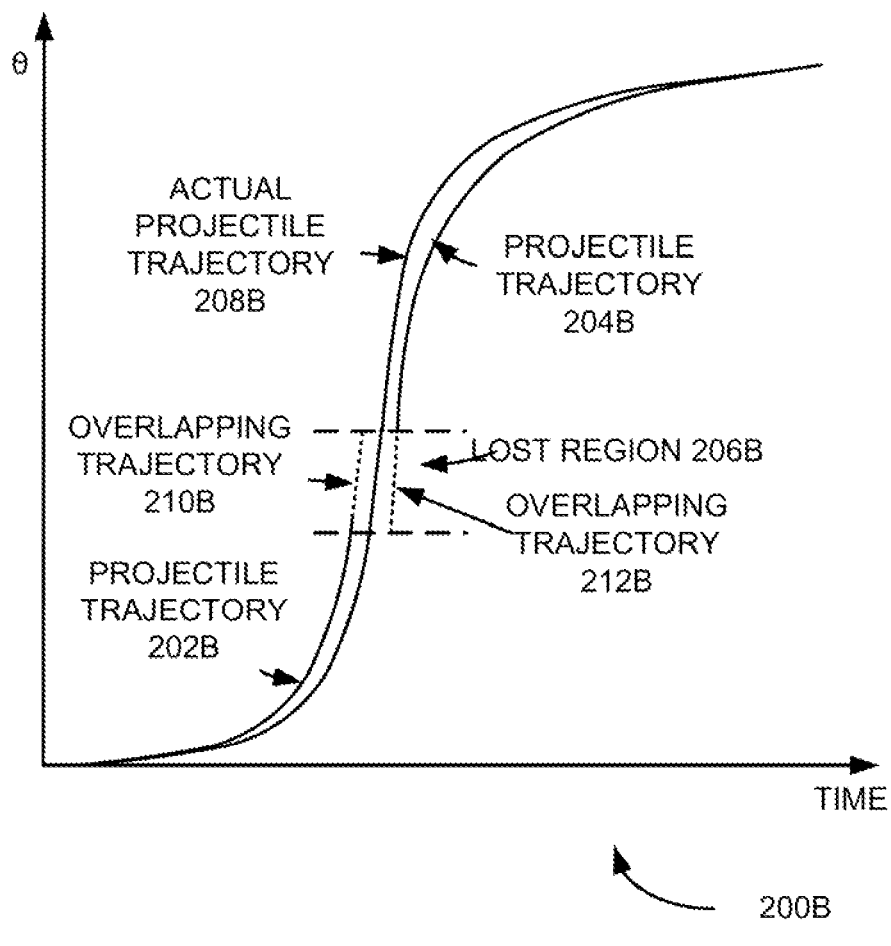
FIG. 2B illustrates an example graphical representation of actual projectile trajectory determined in case of blind-spot discrepancy.

In another example, the error detection and correction unit 108 determines a lost region of the projectile trajectory when the projectile falls outside the first angular range 112 and second angular range 114. In this case, the error detection and correction unit 108 forms overlapping trajectories in the lost region by interpolating the projectile trajectories determined using the first sensor 104 and second sensor 106. Further, the error detection and correction unit 108 determines the actual projectile trajectory by normalizing the overlapping trajectories. In the example graph 200B as shown in FIG. 2B, a lost region 206B of the projectile trajectory may be determined when the projectile falls outside the first and second angular ranges that resulting in blind-spot error 116B In this case, overlapping trajectories 210B and 212B are formed in the lost region 206B by extending, the respective projectile trajectories 202B and 204B determined using the first and second sensors 104 and 106 in the lost region 206B. For example, the respective projectile trajectories 202B and 204B are interpolated to form the overlapping trajectories 210B and 212B in the lost region 206B. Furthermore, the actual projectile trajectory 208B may be determined, by normalizing the overlapping, trajectories 210B and 212B, The normalizing may be done in similar manner as explained in detail above with reference to FIG. 2A. In addition, the actual projectile trajectory 208B may also be corrected based on the vector positions of the first sensor and the second sensor. in FIGS. 2A and 2B, "θ" indicates the angular position of the projectile varying with time.

Furthermore, the error detection and correction unit 108 determines a miss distance of the projectile 110 relative to the platform 102 and the projectile speed using the determined actual projectile trajectory upon compensating for the discrepancy. In one example, the miss distance may be determined by triangulation of the angular position of the projectile 110 estimated from measurements by two sensors (i.e., the first sensor 104 and the second sensor 106). Further, the miss distance of the projectile 110 may be used to estimate a shooter location that indicates a position from which the projectile 110 is fired.

Figure 3:
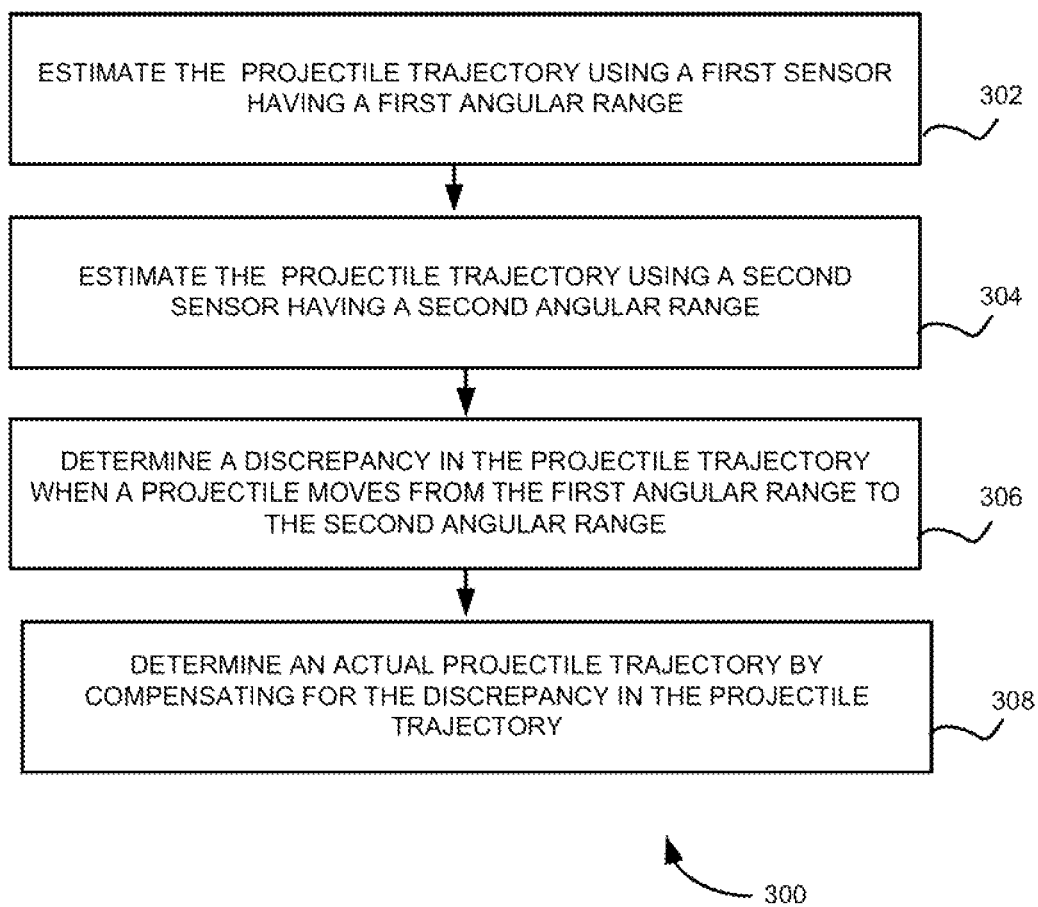
FIG. 3 illustrates an example flow diagram for determining projectile trajectory with at least two sensors.

FIG. 3, illustrates the flow diagram 300 for determining projectile trajectory with at least two sensors. At block 302, the projectile trajectory may be estimated using a first sensor having a first angular range. At block 304, the projectile trajectory may be estimated using a second sensor having a second angular range. In one example, the first sensor and the second sensor are disposed on a platform at different spatial locations. In one example, the projectile trajectory may be estimated using a range estimate of the projectile. The range estimate may be computed using an angular position of the projectile with respect to the platform.

At block 306, a discrepancy in the projectile trajectory may be determined when a projectile moves from the first angular range to the second angular range. In one example, the discrepancy includes a parallax created due to the different spatial locations of the first sensor and the second. sensor. At block 308, an actual projectile trajectory may be determined by compensating for the discrepancy in the projectile trajectory. In one example, the actual projectile trajectory may be determined by compensating for the parallax using a parallax correction.

In one example, an overlapping region of the projectile trajectory may be determined when the projectile is simultaneously tracked by the first and second sensor. In this case, the actual projectile trajectory may be determined by normalizing the projectile trajectories determined using the first and second sensors, in the overlapping region. In another example, a lost region of the projectile trajectory may be determined when the projectile falls outside the first and second angular ranges. In this case, overlapping trajectories in the lost region may be formed by interpolating the projectile trajectories determined using the first and second sensors. Furthermore, the actual projectile trajectory may be determined by normalizing the overlapping trajectories.

Furthermore, a miss distance of the projectile from the platform and projectile speed may be determined using, the determined actual projectile trajectory upon compensating for the discrepancy.

Figure 4:
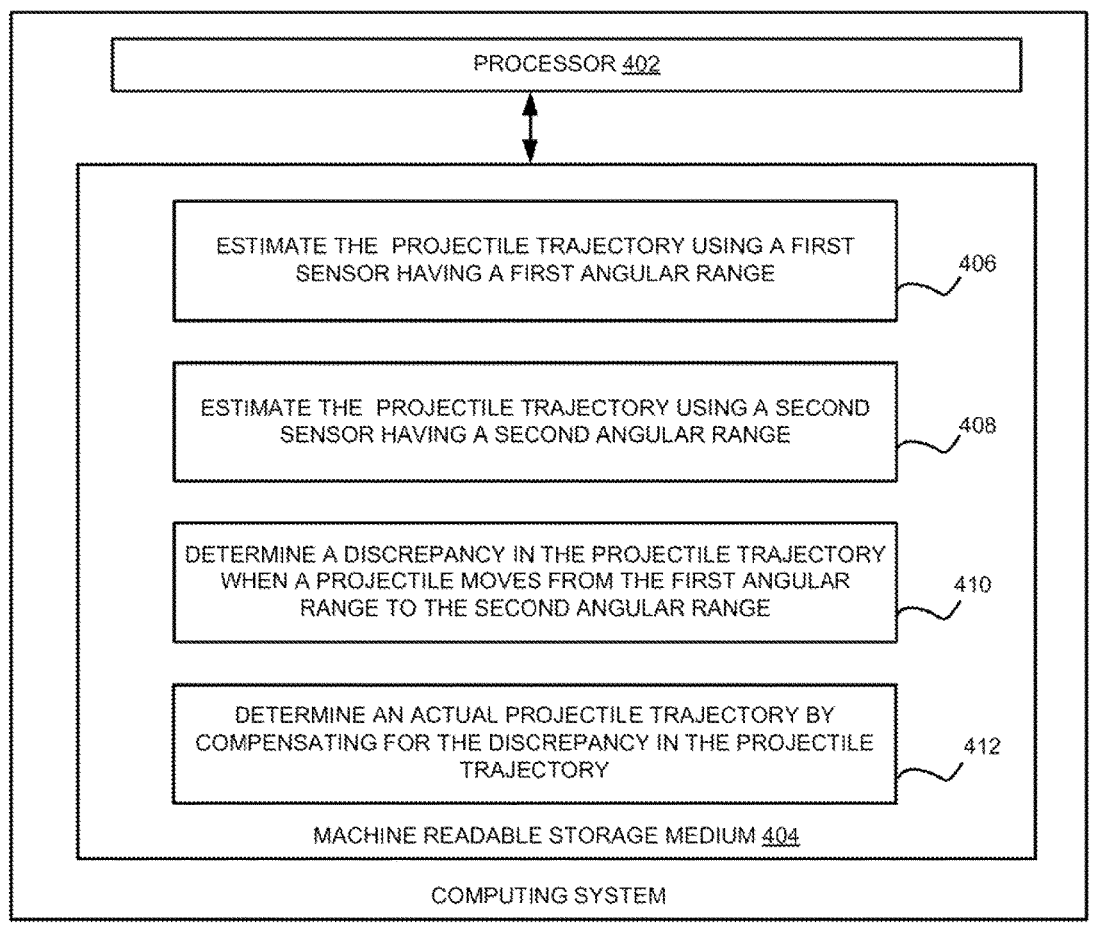
FIG. 4 illustrates an example block diagram of a computing system for determining projectile trajectory with at least two sensors.

FIG. 4, illustrates a block diagram of an example computing system 400 for determining projectile trajectory with at least two sensors. The computing system 400 includes a processor 402 and a machine-readable storage medium 404 communicatively coupled through a system bus. The processor 402 may be any type of central processing unit (CPU), microprocessor, or processing logic that interprets and executes machine-readable instructions stored in the machine-readable storage medium 404. The machine-readable storage medium 404 may be a random access memory (RAM) or another type of dynamic storage device that nay store information and machine-readable instructions that may be executed by the processor 402. For example, the machine-readable storage medium 404 may be synchronous DRAM (SDRAM), double data. rate (DDR), Rambus® DRAM (RDRAM), Rambus® RAM, etc., or storage memory media such as a floppy disk, a hard disk, a CD-ROM, a DVD, a pen drive, and the like. In an example, the machine-readable storage medium 404 may be a non-transitory machine-readable medium. In an example, the machine-readable storage medium 404 may be remote but accessible to the computing system 400.

The machine-readable storage medium 404 may store instructions 406-412. In an example, instructions 406-412 may be executed by the processor 402 for determining the projectile trajectory with at least two sensors.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an drive or via an appropriate connection, such as a DVD or flash memory device) so as to enable or configure the computer-readable medium and/or one or more host computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

The above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying, claims, abstract and drawings), and/or all of the steps of any method or process so disclosed, may be combined in any combination, except combinations where at least some of such features and/or steps are mutually exclusive.

The present description has been shown and described with reference to the foregoing examples. It is understood, however, that other forms, details, and examples can be made without departing from the spirit and scope of the present subject matter that is defined in the following claims.

What is claimed is:

1. A method for determining a projectile trajectory with at least two sensors, the method comprising:
   estimating the projectile trajector using a first sensor having a first angular range:
   estimating the projectile trajectory using a second sensor having a second angular range, wherein the first sensor and the second sensor are disposed on a platform at different spatial locations;
   determining a discrepancy in the projectile trajectory when the projectile moves from the first angular range to the second angular range, wherein the discrepancy is created due to the different spatial locations of the first sensor and the second sensor; and
   determining an actual projectile trajectory by compensating for the discrepancy in the projectile trajectory using the estimated discrepancy.

2. The method of claim 1, wherein determining the discrepancy in the projectile trajectory when the projectile moves from the first angular range to the second angular range comprises one of:

determining an overlapping region of the projectile trajectory when the projectile is simultaneously tracked by the first and second sensors; and determining a lost region of the projectile trajectory when the projectile falls outside the first and second angular ranges.

3. The method of claim 2, wherein determining the actual projectile trajectory by compensating for the discrepancy comprises:

when the projectile is simultaneously tracked by the first and second sensors, determining the actual projectile trajectory by normalizing the projectile trajectories determined using the first and second sensors, in the overlapping region.

4. The method of claim 3, wherein normalizing the projectile trajectories in the overlapping region comprises;

obtaining a last tracked location associated with angular position of the projectile by the first sensor in the first angular range;

obtaining a new tracked location associated with angular position of the projectile by the second sensor in the second angular range; and normalizing the projectile trajectories in the overlapping region based on the last tracked location and the new tracked location of the projectile.

5. The method of claim 2, Wherein determining the actual projectile trajectory by compensating for the discrepancy comprises:

when the projectile falls outside the first and second angular ranges, forming overlapping trajectories in the lost region by interpolating the projectile trajectories determined using the first and second sensors; and determining the actual projectile trajectory by normalizing the overlapping trajectories.

6. The method of claim 1, wherein the discrepancy comprises a parallax that results from the different spatial locations of the first sensor and the second sensor, and wherein the actual projectile trajectory is determined by compensating for the parallax using a parallax correction.

7. The method of claim 1, further comprising: determining a miss distance of the projectile from the platform and projectile speed using the determined actual projectile trajectory upon compensating for the discrepancy.

8. The method of claim 1, wherein the first sensor and the second sensor are electro-optic sensors.

9. The method of claim 1, wherein estimating the projectile trajectory using the first sensor and the second sensor comprises:

determining an angular position of the projectile with respect to the platform; and estimating the projectile trajectory by computing a range estimate of the projectile using the determined angular position.

10. The method of claim 1, wherein the projectile comprises an object selected from the group consisting of a bullet, an artillery shell, a missile, and an object that exhibit a characteristic consistent with the bullet in flight.

11. A system for determining: a projectile trajectory with at least two sensors, the system comprising:

a first sensor and a second sensor, wherein the first sensor and the second sensor are disposed on a platform at different spatial locations;

an error detection and correction unit communicatively connected to the first sensor and the second sensor,. Wherein the error detection and correction unit to:

estimate the projectile trajectory using the first sensor having a first angular range;

estimate the projectile trajectory using the second sensor having a second angular range;

determine a discrepancy in the projectile trajectory when the projectile moves from the first angular range to the second angular range, wherein the discrepancy is created due to the different spatial locations of the first sensor and the second sensor; and determine an actual projectile trajectory by compensating for the discrepancy in the projectile trajectory using the estimated discrepancy.

12. The system of claim 11, wherein the error detection and correction unit to determine one of:

an overlapping region of the projectile trajectory when the projectile is simultaneously tracked by the first and second sensors; and a lost region of the projectile trajectory when the projectile falls outside the first and second angular ranges.

13. The system of claim 12, wherein the error detection and correction unit to:

determine the actual projectile trajectory by normalizing the projectile trajectories determined using the first and second sensors when the projectile is simultaneously tracked by the first and second sensor, in the overlapping region.

14. The system of claim 13, wherein the error detection and correction unit normalizes the projectile trajectories in the overlapping region, by:

obtaining a last tracked location associated with angular position of the projectile by the first sensor in the first angular range;

obtaining a new tracked location associated with angular position of the projectile by the second sensor in the second angular range; and normalizing the projectile trajectories in the overlapping region based on the last tracked location and the new tracked location of the projectile.

15. The system of claim 12, wherein the error detection and correction unit to:

form overlapping trajectories in the lost region by interpolating the projectile trajectories determined using the first and second sensors when the projectile falls outside the first and second angular ranges; and determine the actual projectile trajectory by normalizing the overlapping trajectories.

16. The system of claim 11, wherein the discrepancy comprises a parallax that results from the different spatial locations of the first sensor and the second sensor, and wherein the actual projectile trajectory is determined by compensating for the parallax using a parallax correction.

17. The system of claim Ii, wherein the error detection and correction unit determines a miss distance of the projectile from the platform and projectile speed using the determined actual projectile trajectory upon compensating for the discrepancy.

18. The system of claim 11, wherein the first sensor and the second sensor are electro-optic sensors.

19. The system of claim 11, wherein the projectile comprises an object selected from the group consisting of a bullet, an artillery shell, a missile, and an object that exhibit a characteristic consistent with the bullet in flight.

20. A non-transitory computer-readable storage medium including instructions that are executed by a computation unit to:

estimate a projectile trajectory using a first sensor having a first angular range;

estimate the projectile trajectory using a second sensor having a second angular range, wherein the first sensor and the second sensor are disposed on a platform at different spatial locations;

determine a discrepancy in the projectile trajectory when the projectile moves from the first angular range to the second angular range, wherein the discrepancy is created due to the different spatial locations of the first sensor and the second sensor; and determine an actual projectile trajectory by compensating for the discrepancy in the projectile trajectory using the estimated discrepancy.

* * * * *